June 2, 1970 A. C. WALUS ET AL 3,515,021
WIRE STRAIGHTENING AND CUTOFF MACHINE
Filed June 19, 1968 2 Sheets-Sheet 1
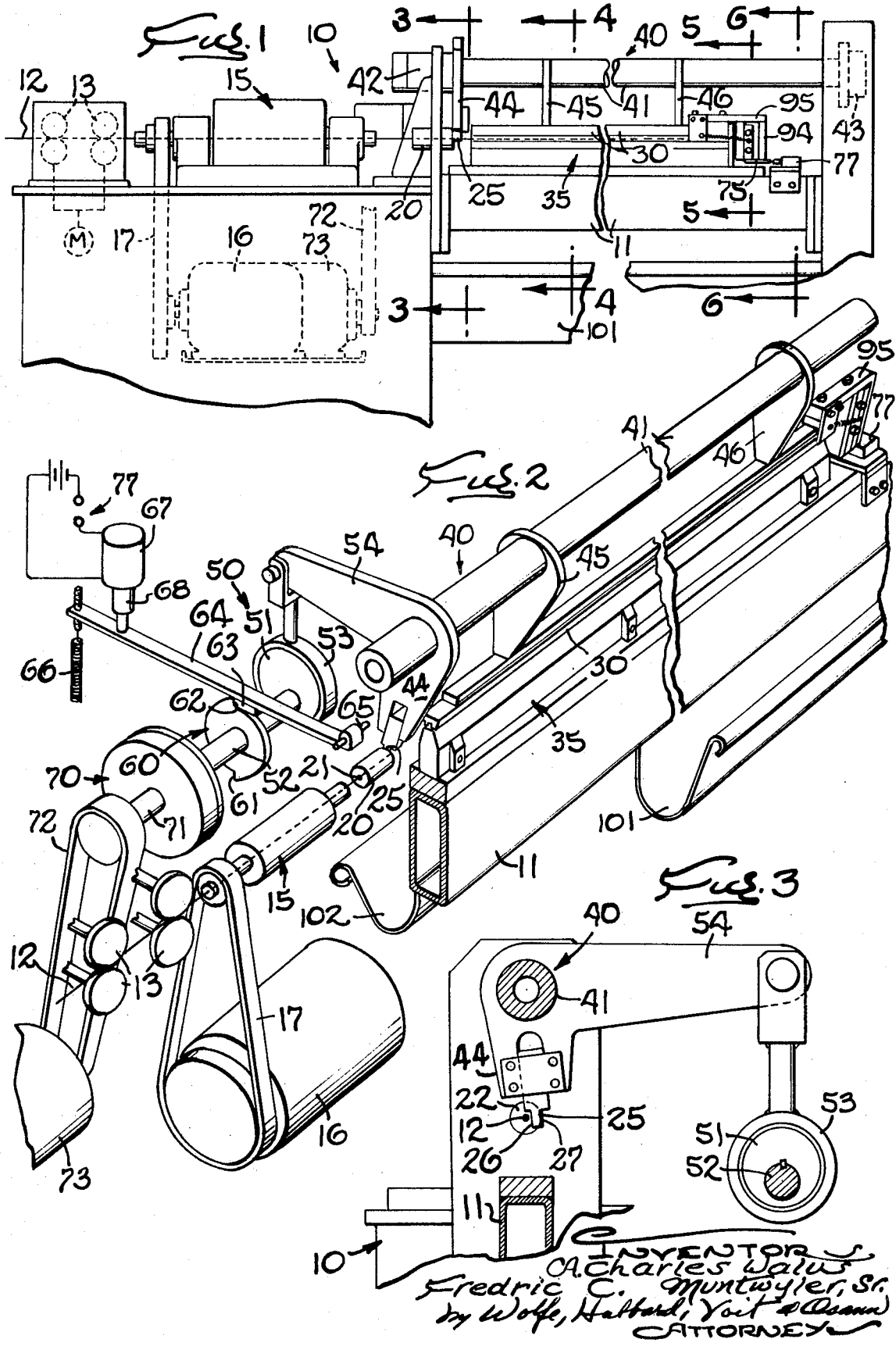

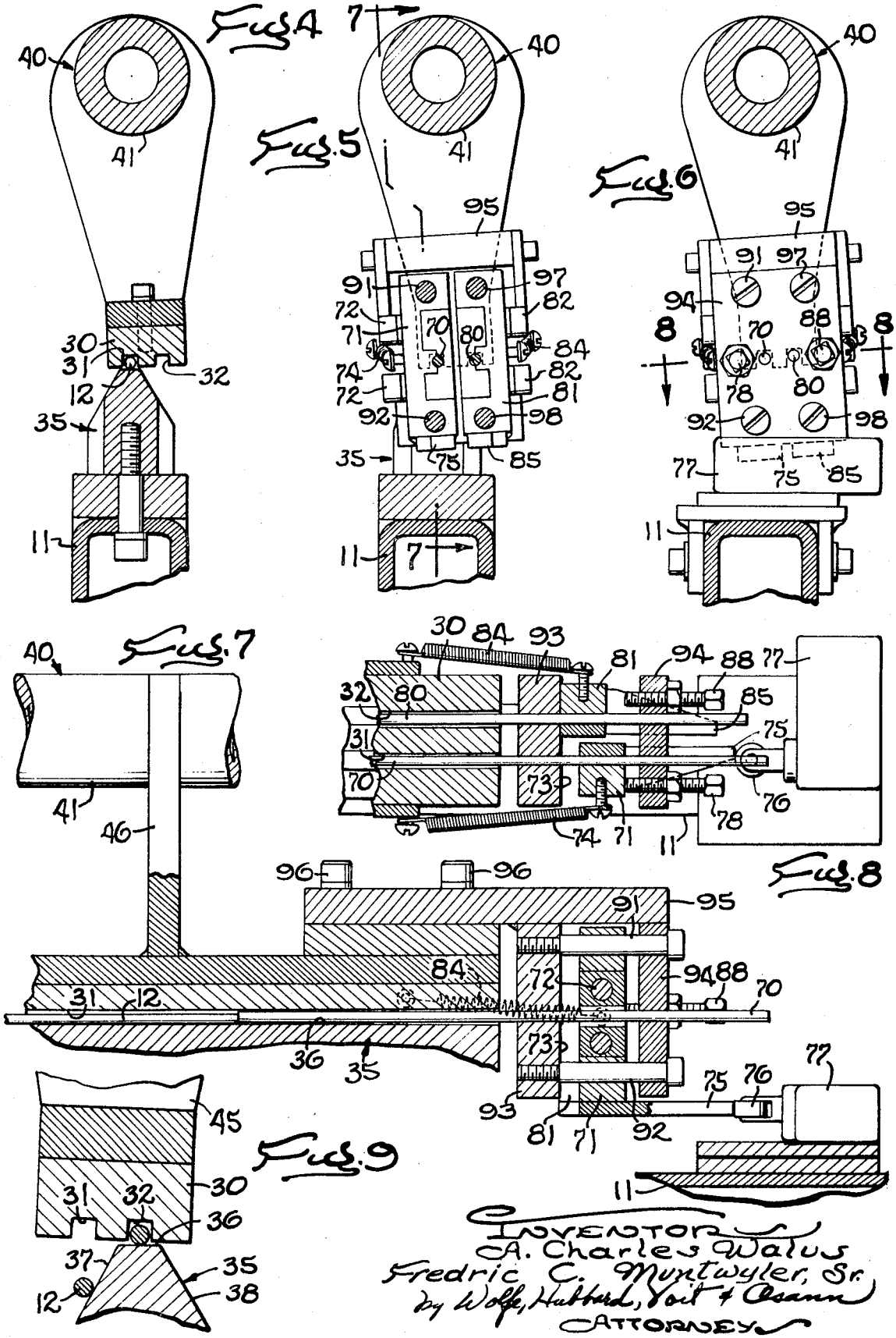

United States Patent Office 3,515,021
Patented June 2, 1970

3,515,021
WIRE STRAIGHTENING AND CUTOFF MACHINE
A. Charles Walus, Chicago, and Fredric C. Muntwyler, Sr., Palos Park, Ill., assignors to Wire Machinery, Incorporated, Chicago, Ill., a corporation of Illinois
Filed June 19, 1968, Ser. No. 738,303
Int. Cl. B21f 11/00
U.S. Cl. 83—80          7 Claims

ABSTRACT OF THE DISCLOSURE

A wire straightening and cutoff machine in which a plurality of grooves are provided for receiving an oncoming continuous length of wire with means for cutting off the wire after a predetermined length has been fed into one of the grooves and for thereafter indexing a new groove into receiving position while permitting the cut piece of wire to drop into a storage receptacle. Adjustable gauge rods are provided at the far end of each of the grooves for obstructing the leading end of the wire thereby to trigger the cutting and indexing movement.

---

It is an object of the present invention to provide a straightening and cutoff machine which is capable of cutting a continuously fed wire into pieces of predetermined length. It is a related object to provide a cutoff machine for cutting a continuously fed wire into pieces of different length for depositing into respective storage receptacles.

It is another object of the present invention to provide a cutoff machine which is capable of cutting wire fed continuously at a high rate of speed without risk of obstruction or jamming.

It is a further object to provide a wire cutoff machine which is simple and economical in construction and which is positive and reliable in operation.

Then too it is an object of the present invention to provide a cutoff machine for cutting wire to accurate predetermined lengths which is adjustable over a wide range.

Other objects and advantages of the invention will become apparent upon reading the attached detailed description and upon reference to the drawings in which:

FIG. 1 is an elevational view, foreshortened and partially in section, showing a wire straightening and cutoff machine constructed in accordance with the present invention;

FIG. 2 is a perspective diagram of the wire straightening and cutoff machine;

FIG. 3 is a fragmentary transverse section taken along the line 3—3 in FIG. 1 and showing the profile of the cutting blade;

FIG. 4 is a transverse section looking along the line 4—4 in FIG. 1 showing the oscillating frame in one of its positions;

FIG. 5 is a fragmentary transverse section taken along the line 5—5 in FIG. 1;

FIG. 6 is a similar section taken along the line 6—6 in FIG. 1;

FIG. 7 is a fragmentary vertical section through the gauge means taken along the line 7—7 in FIG. 5;

FIG. 8 is a fragmentary horizontal section taken along the line 8—8 in FIG. 6; and FIG. 9 is a fragmentary view showing the receiving member in its alternate position with a cut piece dropping free.

While the invention has been described in connection with a preferred embodiment, it will be understood that it is not intended to limit the invention to such embodiment but it is on the contrary intended to cover the various alternative and equivalent constructions included within the spirit and scope of the appended claims.

Turning now to the drawings, there is disclosed in FIGS. 1 and 2 a straightening and cutoff machine 10 having a frame 11 which receives a continuous length of wire 12 from a suitable storage reel (not shown). The wire is propelled by feed roll 13 coupled to a source of rotative power M and capable of driving the wire at a speed which may, for example, be in the range of 200 feet per minute, or even greater depending on gauge or stiffness. From the feed rolls the wire passes into a rotary type straightening arbor 15 in which the wire is diverted from a true axial path and which is rotated at a high rate of speed, preferably on the order of six to seven thousand r.p.m. by means of a drive motor 16 to which it is coupled by a belt 17. From the straightening arbor the wire passes into a small cylindrical cutoff die 20 having a central opening 21 and a cutoff face 22. Cooperating with the die is a cutoff blade 25 having oppositely facing edges 26, 27. (See FIG. 3.)

In accordance with the present invention an indexed receiving member is provided in front of the cutoff die having downwardly facing grooves which are arranged parallel to one another and which have a stationary run-out track which effectively encloses the wire-receiving groove but which leaves the other groove open. A power actuator, which is triggered by the feeding of a predetermined length of wire into the wire-receiving groove simultaneously imparts a stroke of movement to the blade for cutting off the wire and a stroke of indexing movement to the receiving member so that the cut piece of wire is permitted to drop free as the alternate groove is moved into the wire-receiving position. More specifically stated, the blade and wire-receiving member are mounted upon an oscillating frame which is driven by an indexing type clutch which is successively triggered to oscillate the frame cyclically between the alternate wire-receiving positions. Thus, turning to the drawings, a longitudinally extending receiving member 30 is provided spaced forwardly of the die and having a pair of laterally spaced grooves 31, 32. Arranged in alinement with the die is a run-out track 35 having a narrow ridge 36 and sloping sidewalls 37, 38 (FIG. 9). The run-out track thus blockingly encloses the groove which is in the wire-receiving position while leaving the remaining groove open so that the cut piece of wire previously deposited therein is free to fall by gravity into a storage trough to be described.

For simultaneously moving the receiving member 30 between its alternate, wire-receiving positions, and for imparting a stroke of movement to the cutting blade 25, the member 30 and cutting blade are mounted upon an oscillating frame 40 having a shaft 41 mounted in suitable alined bearings, 42, 43. The cutting blade 25 is mounted upon an arm 44 which is welded or otherwise secured to the shaft while the receiving member 30 is mounted upon similar arms 45, 46.

For the purpose of oscillating the frame 40 a power actuator 50 is provided which includes an indexing type clutch and an eccentric. The eccentric, indicated at 51, is mounted upon a shaft 52. The eccentric has an encircling collar 53 which is connected to an arm 54 which is drivingly connected to the shaft 41 for oscillating the shaft back and forth. For the purpose of imparting 180° of rotation to the shaft 52 and the eccentric which is mounted thereon, a half-revolution clutch 60 is provided having stop surfaces 61, 62 which successively engage a dog 63 arranged in the path of movement. The dog is mounted upon a release arm 64, pivoted at 65, and which is normally held in its engaging position by a tension spring 66. For imparting upward or releasing movement to the release arm 64, a solenoid 67 may be used having a plunger 68.

To apply torque to the shaft 52, a slip clutch 70 is shown having an input shaft 71 which is driven via a belt 72 from a continuously running motor 73. It will be apparent, then, that when the solenoid 67 is momentarily energized lifting the arm 64, the dog 63 is lifted clear of the stop face 62 permitting the shaft 52 to rotate under the urging of the slip clutch. Since the actuation of the solenoid is only momentary, the arm 64 is free to drop back under the urging of the return spring 66 thereby interposing the dog 63 in the path of movement of the oncoming stop face 61, thus imparting 180° of movement to the eccentric and causing a single stroke of oscillation of the blade 25 and receiving member 30. This severs the wire and moves the alternate groove into its receiving position in front of the cutoff die to receive the leading end of the wire. When the solenoid 67 is next actuated the reverse movement takes place, cutting the next piece of wire and restoring the first groove to its wire-receiving position.

For the purpose of triggering the power actuator mechanism 50, by applying a voltage impulse to the solenoid 67, adjustable gauge rods are provided at the far end of each of the grooves 31, 32 in obstructing relation to the leading end of the wire. The gauge rods are arranged so that when obstruction takes place, slight retreating movement is produced to actuate a switch which is connected in the circuit of the solenoid 67. Thus, turning to FIGS. 5-8, a gauge rod 70 occupies the groove 31. Such gauge rod is mounted in a gauge member 71, being adjustably clamped therein by clamping screws 72. The gauge member is "forwardly" biased against a reference surface 73 by means of a tension spring 74. The gauge member 71 is provided with a tail 75 which actuates a roller 76 on a switch 77. Similarly, a gauge rod 80, occupying the groove 32, is received in a gauge member 81, being adjustably held therein by clamping screws 82 and with the gauge member being normally bottomed on the reference surface 73 by means of a tension spring 84. A tail 85 projecting from the gauge member 81 is capable of engaging the same roller 76 of the switch when the receiving member is in its alternate extreme position.

For the purpose of guiding the gauge member 71 for limited endwise movement of the gauge rod, the gauge member is mounted for sliding movement upon a pair of vertically spaced axially extending bolts 91, 92. The latter extend between vertical supports 93, 94 which are secured to a horizontal bracket 95 which is secured in turn by means of screws 96 to the wire-receiving member 30. The companion gauge member is slidably supported upon a second pair of vertically arranged bolts 97, 98 which also extend horizontally between the support members 93, 94. To prevent overtravel of the guage members 31, 81, and possible damage to the switch, limit stops 78, 88, are provided in the form of adjustable screws mounted in the support member 94.

In operation, then, the receiving member 30 is positioned so that the groove 31 is aligned with the cutoff bushing with the surface 36 of the run-out track 35 enclosing the underside of the groove. The wire is advanced by the drive rollers 13 into the straightening arbor 15 and through the cutoff bushing 20. When the leading tip of the wire strikes the end of the gauge rod 70, the rod, and gauge member 71 to which it is connected, retreat against the force of bias of the spring 74 so that the tail of the gauge member engages the roller 76 of the switch 77 to apply an impulse to the solenoid 67. For the simplest possible control circuitry, it will be understood that the switch 77 is of the type which produces a single short impulse each time the switch plunger is actuated, but it will be understood by one skilled in the art that a conventional switch plus pulse-forming circuitry may be employed without departing from the invention. The solenoid raises the stop 63 out of obstructing position so that the shaft 52 may rotate, but the stop is immediately dropped back into obstructing position with respect to the second stop surface 61. Thus the eccentric undergoes 180° of movement. This rocks the cutting blade past the cutoff die 20 severing the wire. Simultaneously, the receiving member swings the groove 32 into alined position above the run-out track and the groove 31 away from the run-out track so that the cut piece of wire is able to drop free as shown in FIG. 9. The piece is dropped into a collection trough 101. The tail 75 is shifted out, and the tail 85 is shifted into switch-engaging position.

The wire, being continuously fed, shortly thereafter strikes the gauge rod 80, causing the tail 85 of the gauge 81 to actuate the switch resulting in another 180° of rotation of the eccentric and a stroke of the blade in the opposite direction to sever the piece of wire, accompanied by rocking of the receiving member into its alternate position and enabling the second piece of wire to fall into the collection trough 102 on the opposite side of the machine. This process is repeated. Each stroke of the cutting blade occurs with sufficient rapidity so that the wire is not appreciably decelerated as it is being cut. Any momentary slowup of the wire below rated speed during cutting is readily accommodated by slight slippage at the drive rollers 13. Because the cutoff blade and the carrier are mechanically coupled together, completion of the active portion of the stroke of the cutting blade insures that the "new" groove is in readiness to receive the new length of oncoming wire. A margin of safety is provided by the axial spacing between the cutoff bushing and the mouths of the grooves.

Using a high quality switch in which the circuit is positively made at a predetermined point in the stroke of the switch plunger, it is found that close tolerances can be achieved, even at a high rate of speed. While a rudimentary form of actuator 50 has been shown in the drawing to facilitate understanding the invention, it will be understood that more highly developed designs of commercially available indexing clutches may be substituted for that which is illustrated without in any way departing from the invention. While a cylindrical form of cutoff die has been shown and described, it will be understood that the term "die" is intended to include any anvil which may be provided adjacent the path of the wire and against which the blade is capable of working. The term "eccentric" shall be understood to include a cam or crank performing an equivalent function. Also, while a continuous run-out track surface 36 is preferred, it will be apparent that the track need not be smoothly continuous and any support member defining a narrow closure for the active one of the grooves, capable of keeping the wire in the groove, will suffice. For high production runs of pieces of a certain length, the two gauge rods may be adjusted identically, but in most cases different adjustments will be used so that two different lengths may be simultaneously produced.

It will be apparent to one skilled in the art that the receiving member and blade may be mounted for translation rather than rocking movement without departing from the invention and it will be further apparent that it is the relativity of movement between the blade and die and between the receiver and track respectively which is an important aspect of the invention.

We claim as our invention:

1. In a wire cutoff machine the combination comprising a source of straight wire, a cutoff die, means for advancing the wire continuously through the cutoff die, a receiving member having a pair of downwardly facing grooves arranged parallel to one another and spaced forwardly of the die, a double edge blade cooperating with the die, an oscillating frame for mounting the receiving member and the blade for oscillation between alternate positions in which the grooves are alined successively with the die, a stationary run-out track alined with the die for enclosing the receiving groove while leaving the remaining groove open, means including an indexing clutch for imparting a stroke of oscillating movement to the frame so that the cut piece of wire is free to fall from the receiving groove and so that the alternate groove is presented in wire-receiving position, and means including an obstruction in each of the grooves responsive to the feeding of a predetermined length of wire into the receiving groove for triggering the power actuator.

2. The combination as claimed in claim 1 in which the power actuator includes a driven shaft having an eccentric coupled to the frame and in which the indexing clutch is in the form of a half revolution clutch for stopping the eccentric in its respectively extreme positions of throw.

3. In a wire cutoff machine the combination comprising a source of straight wire, a cutoff die, means for advancing the wire continuously through the cutoff die, a receiving member having a plurality of downwardly facing grooves arranged parallel to one another and spaced forwardly of the die, a stationary run-out track alined with the die and enclosing the selected groove while leaving the remaining grooves open, a movable blade cooperating with the die, means including a power actuator for simultaneously moving the blade and laterally indexing the receiving member to permit the cut piece of wire to drop free of the receiving groove and to present the adjacent groove in wire-receiving position, and means including an obstruction in each of said grooves responsive to the feeding of a predetermined length of wire into the receiving groove for triggering the power actuator.

4. In a wire cutoff machine the combination comprising a source of straight wire, a cutoff die, means for advancing the wire continuously through the cutoff die, a receiving member spaced forwardly of the die and having a pair of downwardly facing grooves arranged parallel to one another, the receiving member being laterally movable between alternate positions in which the grooves are respectively alined with the die, a stationary run-out track alined with the die for enclosing the receiving groove while leaving the remaining groove open, a double edged blade cooperating with the die and movable into alternate positions, means including a power actuator for simultaneously imparting a stroke of movement to the blade and receiving member so that the cut wire falls free of the groove and so that the alternate groove is presented in wire-receiving position in front of the die, and means including an obstruction in each of said grooves responsive to feeding of a predetermined length of wire into the receiving groove for triggering the power actuator.

5. In a wire cutoff machine the combination comprising a source of straight wire, a cutoff die, means for advancing the wire continuously through the cutoff die, an indexed receiving member having a plurality of downwardly facing grooves arranged parallel to one another and spaced forwardly of the die with one of the grooves in alined receiving position, a stationary run-out track alined with the die and enclosing the groove in receiving position while leaving an adjacent groove open, a movable blade cooperating with the die, means including a power actuator for simultaneously imparting a stroke of cutting movement to the blade and a stroke of indexing movement to the receiving member to permit the cut piece of wire to drop free of its groove and to present the adjacent groove in wire-receiving position, and means including gauge rods adjustably positioned in the respective grooves at the far end thereof and responsive to impact by the leading end of the wire for triggering the power actuator.

6. In a wire cutoff machine the combination comprising a source of straight wire, a cutoff die, means for advancing the wire continuously through the cutoff die, an indexed receiving member having a plurality of downwardly facing grooves arranged parallel to one another and spaced forwardly of the die with one of the grooves in alined receiving position, a stationary run-out track alined with the die enclosing the groove in receiving position while leaving an adjacent groove open, a movable blade cooperating with the die, means including a power actuator for simultaneously imparting a cutting stroke to the blade and a stroke of indexing movement to the receiving member to permit the cut piece of wire to drop free to present the adjacent groove in wire receiving position, gauge means at the end of the receiving member having a plurality of gauge rods adjustably mounted therein and occupying the respective grooves, said gauge rods being biased to a reference position and mounted for slight retreating movement when one of the gauge rods is engaged by the leading end of the wire, and a switch associated with the gauge means and actuated by said retreating movement for triggering the power actuator.

7. In a wire cutoff machine the combination comprising a source of straight wire, a cutoff die, means for advancing the wire continuously through the cutoff die, a receiving member having a plurality of groove means arranged parallel to one another and spaced forwardly of the die, a run-out track alined with the die and enclosing a selected receiving groove while leaving the remaining groove means open, a cutter blade cooperating with the die, means including a power actuator for relatively moving the blade with respect to the die and relatively indexing the receiving member with respect to the run-out track to permit the cut piece of wire to drop free of the receiving groove and to present the adjacent groove means in wire-receiving position, and means including an obstruction in said groove means responsive to the feeding of a predetermined length of wire into the receiving groove for triggering the power actuator.

References Cited

UNITED STATES PATENTS 2,930,268   3/1960   Neptune _____ 83—80

JAMES M. MEISTER, Primary Examiner

U.S. Cl. X.R.

83—102, 159